(12) United States Patent
Boudville

(10) Patent No.: US 11,235,251 B2
(45) Date of Patent: Feb. 1, 2022

(54) BYPASS A GAME WATCHING PLATFORM

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 342 days.

(21) Appl. No.: 16/602,310

(22) Filed: Sep. 11, 2019

(65) Prior Publication Data

US 2021/0069600 A1    Mar. 11, 2021

(51) Int. Cl.
| | | |
|---|---|---|
| *A63F 13/86* | (2014.01) | |
| *A63F 13/792* | (2014.01) | |
| *A63F 13/35* | (2014.01) | |
| *A63F 13/61* | (2014.01) | |
| *G06Q 20/12* | (2012.01) | |
| *G06Q 30/02* | (2012.01) | |

(52) U.S. Cl.
CPC ............. *A63F 13/86* (2014.09); *A63F 13/35* (2014.09); *A63F 13/61* (2014.09); *A63F 13/792* (2014.09); *G06Q 20/127* (2013.01); *A63F 2300/53* (2013.01); *A63F 2300/5506* (2013.01); *A63F 2300/5513* (2013.01); *A63F 2300/577* (2013.01); *G06Q 30/0277* (2013.01)

(58) Field of Classification Search
CPC combination set(s) only.
See application file for complete search history.

(56) References Cited

U.S. PATENT DOCUMENTS

| | | | |
|---|---|---|---|
| 2014/0113718 A1* | 4/2014 | Norman | A63F 13/497 463/31 |
| 2014/0349746 A1* | 11/2014 | Boudville | A63F 13/31 463/29 |
| 2016/0217217 A1* | 7/2016 | Boudville | G06K 19/06037 |
| 2016/0359945 A1* | 12/2016 | Boudville | H04L 67/04 |
| 2017/0001111 A1* | 1/2017 | Willette | A63F 13/86 |
| 2017/0003740 A1* | 1/2017 | Verfaillie | G06F 3/013 |
| 2017/0109814 A1* | 4/2017 | Boudville | H04L 67/02 |
| 2017/0157512 A1* | 6/2017 | Long | A63F 13/86 |
| 2018/0124148 A1* | 5/2018 | Boudville | A63F 13/5378 |
| 2018/0349395 A1* | 12/2018 | Boudville | G06F 40/134 |
| 2019/0130416 A1* | 5/2019 | Boudville | G06Q 20/1085 |
| 2019/0217205 A1* | 7/2019 | Atli | A63F 13/352 |
| 2019/0388792 A1* | 12/2019 | Goslin | A63F 13/79 |
| 2021/0197093 A1* | 7/2021 | George | A63F 13/87 |

* cited by examiner

*Primary Examiner* — Jay Trent Liddle

(57) ABSTRACT

In esports a game firm has a game played by a gamer and shown on a third party viewing platform. To the firm, the platform is a middleman. The customer of the platform should be a customer of the firm. The gamer guides a viewer to watch the gamer on a read only copy of the game installed on the viewer's computer. The platform is bypassed. The viewer is now the firm's customer. The firm monetizes with ads and subscriptions. A viewer can be a tour guide of the game to other viewers.

19 Claims, 9 Drawing Sheets

Player and Fans

Figure 3  Solution

Email 61

Dear Bob,

Thanks for following me! Watch my game by clicking

[ Gamer Jill ] _____

See ya!

Jill :)

Figure 6

Figure 7  Gamer + 2 Fans

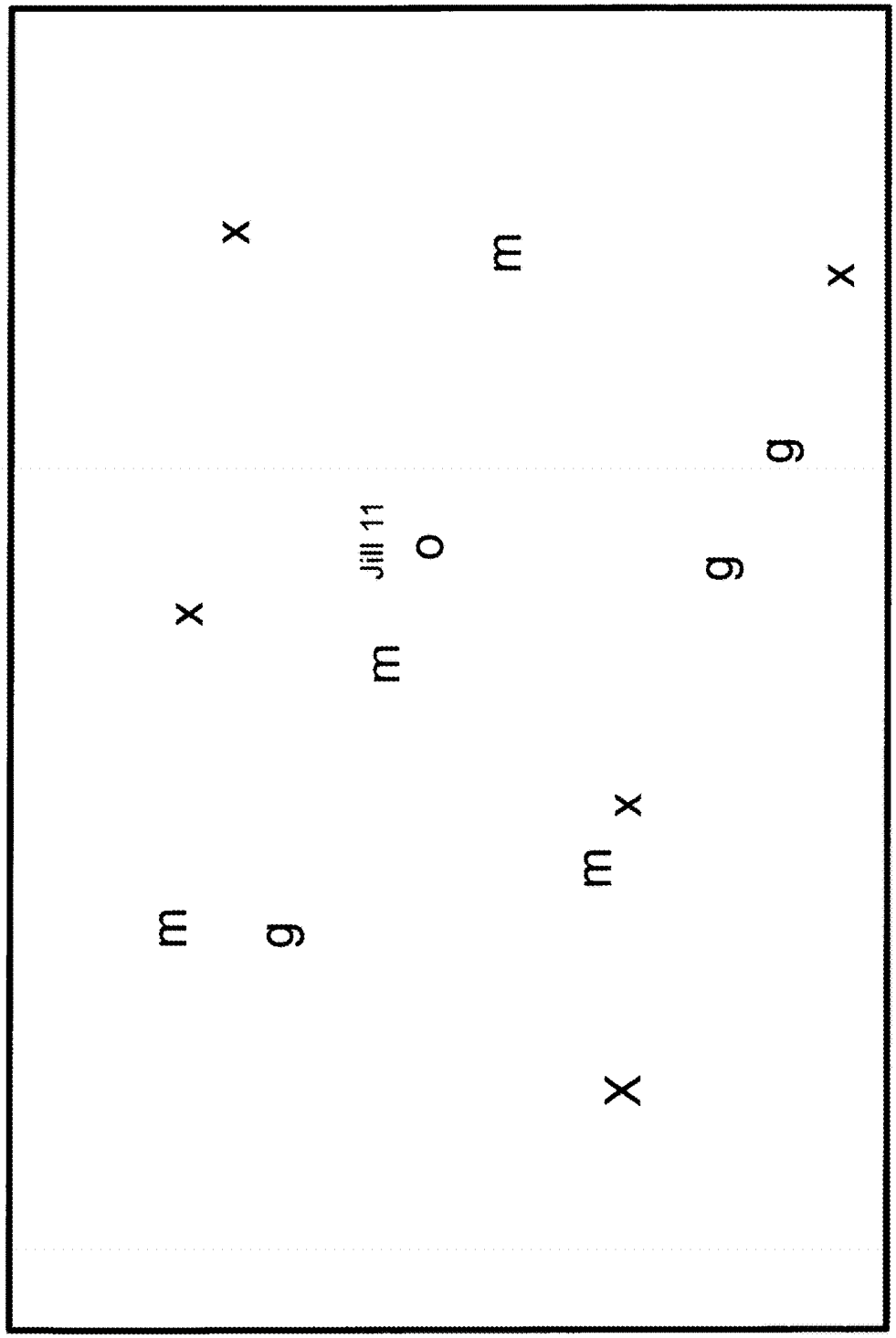
Figure 9  Player and Fans

BYPASS A GAME WATCHING PLATFORM

REFERENCES CITED

"Apps everywhere but no unifying link" by C. Dougherty, New York Times, 5 Jan. 2015.

"Deep linking's big untapped potential" by M. Thomson, VentureBeat.com, 9 Aug. 2015.

TECHNICAL FIELD

The invention involves esports—the viewing of a computer game played by another person.

BACKGROUND

Esports rose to prominence in the last 10 years. It is the watching of someone else playing a computer game. Local esports is where the viewers are in the same physical space as the persons playing the game. This can be a sports arena where the viewers are sitting in the usual places associated with, say, a basketball game. While the gamers are sitting at tables on the floor usually occupied by the basketballers.

Remote esports is where viewers watch on their computers.

BRIEF DESCRIPTION OF THE DRAWINGS

FIG. 6 shows an email Jill sends to fans, with her linket.

FIG. 9 shows a map of Jill's game with native fans.

DETAILED DESCRIPTION OF THE PREFERRED EMBODIMENT

What we claim as new and desire to secure by letters patent is set forth in the following.

In this submission, the term phone means a mobile phone. It includes the case of using the device known as a smartphone. More broadly, we will often describe a person using a phone. This can be extended to the use of other types of mobile electronic devices or wearable devices. Like augmented reality (AR) and virtual reality (VR) devices, laptops, PDAs, HUDs. It can also include the use of personal computers and other desktop devices.

We use viewer, watcher and fan as equivalent terms, unless otherwise designated.

The submission has the following sections:
1: Introduction;
2: Problem is the Platform;
3: Bypass the Platform;
4: Mass Customization and Roaming;
5: Team Includes Fans;
6: Time Travel;
7: Gamer having esports Fans and native Fans;
8: Using only Deep Links;
9: A fan acting as a Tour Guide;

1: Introduction

This invention discusses remote esports. Currently the field is dominated by 2 firms, Twitch Corp. and YouTube Corp. Twitch Corp. is owned by Amazon Corp. and YouTube Corp. by Google Corp. (aka. Alphabet Corp.). In this invention we will use "esports" to mean "remote esports". There are smaller competitors, like Smashcast Corp. and Mobcrush Corp.

Esports can be divided into live and recorded. Live means the viewer is watching a live game. Recorded means he is watching a recorded game. Live esports tends to be associated with Twitch Corp. and recorded with YouTube Corp. Though in fact the bulk of the content on Twitch Corp.'s site is recorded.

The above firms have a common approach. Each has a website or app (usually both) that shows a choice of games. The viewer uses his computer to go to the app, say, and picks a game to watch. The game is then shown on his computer.

The gaming industry tends to refer to the firms as game viewing platforms. We conform to this usage and use "Platform", capitalized thusly.

Figure 1:
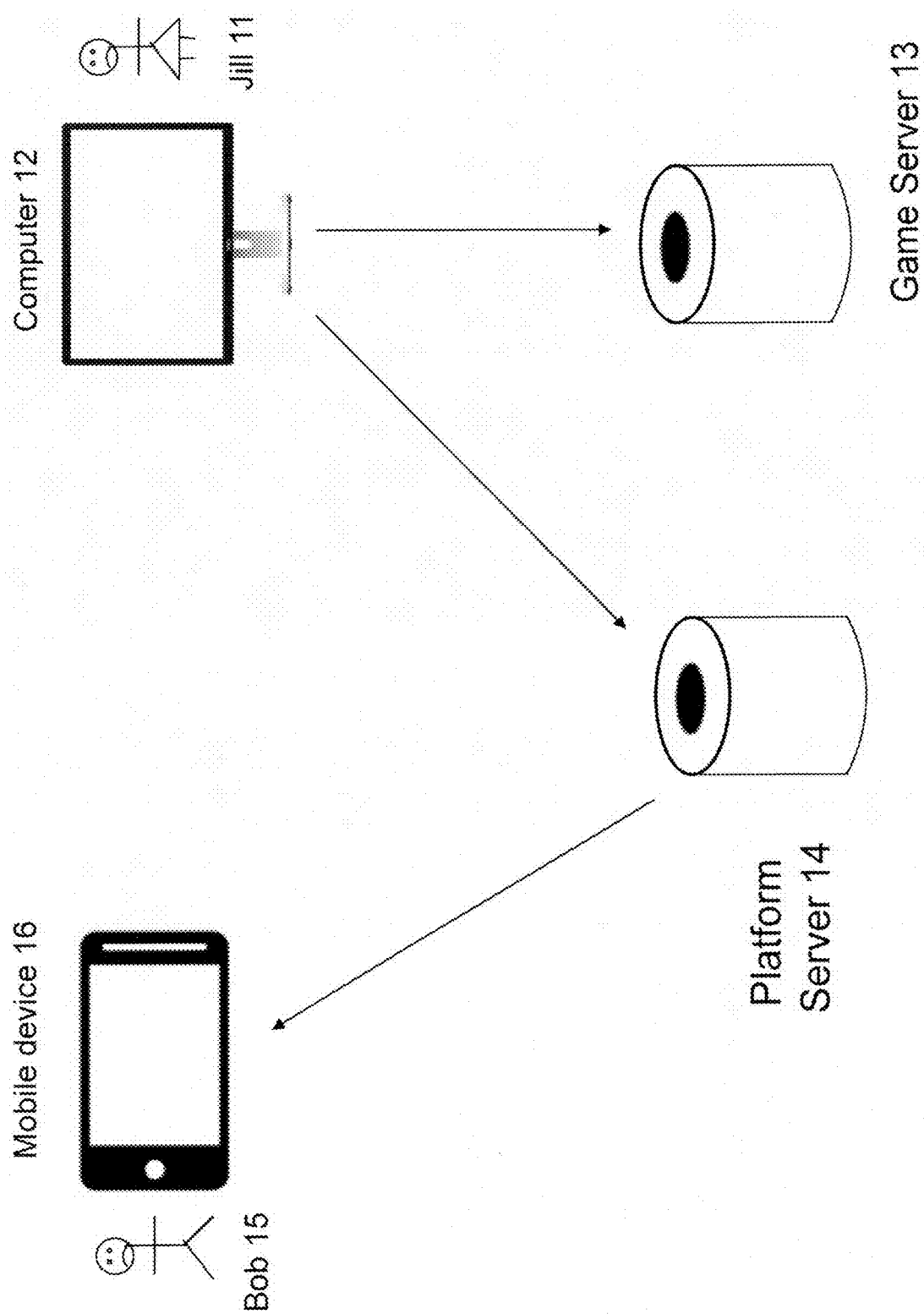
FIG. 1 shows a viewer watching a game on a viewing platform.

FIG. 1 shows gamer Jill 11, in front of her computer 12. She plays a game that talks to game server 13. On her computer she had earlier installed a program from a viewing Platform. That program records her interactions in the game and talks to Platform Server 14. This is also the server for the Platform website or app that runs on viewer Bob 15's mobile device 16.

Jill's computer is depicted as a personal computer while Bob's computer is shown as a mobile device. Currently gamers tend to play on personal computers, because the large screens and memory and disk offer the best gaming experience. But not exclusively. It is possible for Jill's computer to be a mobile computer.

Viewers use their own personal computers or laptops or, say, mobile phones. This invention will describe for the most part where the viewers use mobile phones. Though this is not a limiting factor. It conforms to the practical reality that mobile phones are the most common consumer computer in the world and are readily available at most times to users.

We also describe where Bob has earlier installed an app from the Platform to watch games. He prefers to use the app rather than his mobile browser to go to the Platform's website. In general, the User Experience (UX) is better on a mobile app than the mobile browser.

Figure 2:
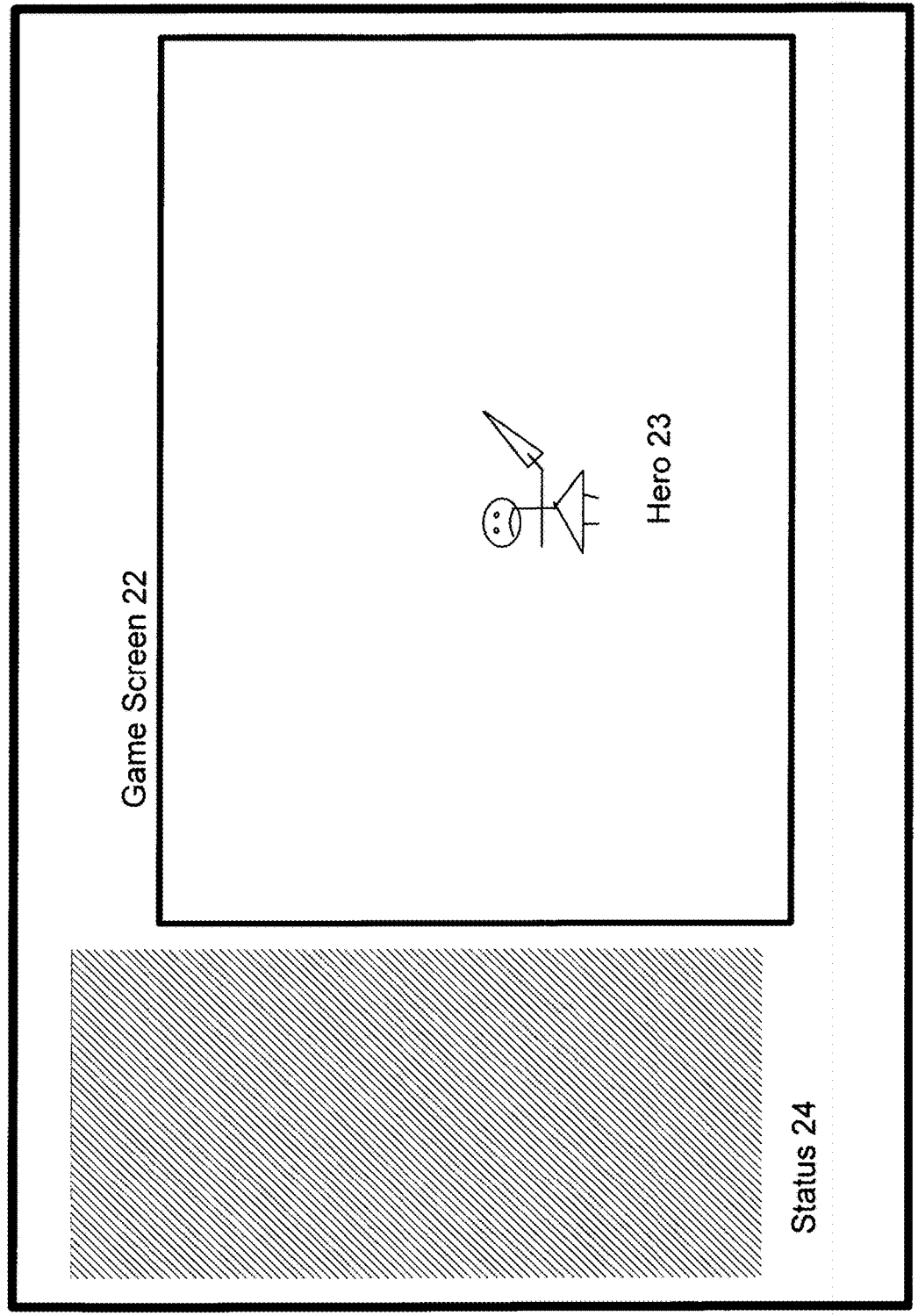
FIG. 2 shows what the viewer sees in the Platform app.

The Platform app is a superset of what Jill sees on her game screen. FIG. 2 shows Platform app 21. Inside is Game screen 22. This is essentially what Jill sees in her game app. A character Hero 23 is shown. This is Jill's character in the game. Of course Game screen 22 will usually have many more items (monsters, treasure . . . ) in the game that Jill can interact with.

The Platform app might also have a Status 24 section, showing various items. Though because of the small size of Bob's device, Status 24 might more likely be in a separate screen of the app. Most likely Status 24 would be or include a message board for viewers to type remarks, and perhaps for Jill to also do so.

Game screen 22 could have some characters or glyphs overlaying it, that come from the Platform app. These might act to make what Bob sees in Game Screen 22 unique compared to other viewers. But essentially all viewers see the same underlying gist of Jill's game on their apps.

2: Problem is the Platform

Returning to FIG. 1, we see 1 outstanding feature. Bob is a customer of the Platform, not of the game, even though he is watching the game. From the point of view of the firm that makes the game, the Platform is the middleman. The Platform monetizes Bob by showing him ads or selling subscriptions to avoid the ads. It could also let Bob donate money (or some equivalent digital currency) to Jill. The Platform generally passes on all donations to Jill, and shares some percentage of the ad and subscription revenue with her.

But the game firm derives no revenue from Bob. Indeed, it does not even know how to contact him. The Platform app shows the total number of viewers Jill has. For a popular game and a popular Jill, this total may serve simply to aggravate the firm. It owns the Intellectual Property of the game, viz. graphics and game design. De jure, it has the right to ask the Platform to refrain from showing live or recorded instances of its game. De facto, most game firms desist upon fear of antagonizing fans watching their game on the Platform. The Platform typically says the firms benefit by garnering mindshare and that they should be grateful.

The Platform does not own any games. It bears no risk of game development or, if a game is successful, the cost of maintaining a game. The latter includes making new skins for gamers, new scenarios ("levels"). The startups mentioned earlier are all configured as Platforms. And they have enormous capital costs for (outgoing) bandwidth to broadcast the games, and for memory and storage. If any startups are successful, to a game firm nothing has changed. One middleman is replaced by another.

3: Bypass the Platform

Figure 3:
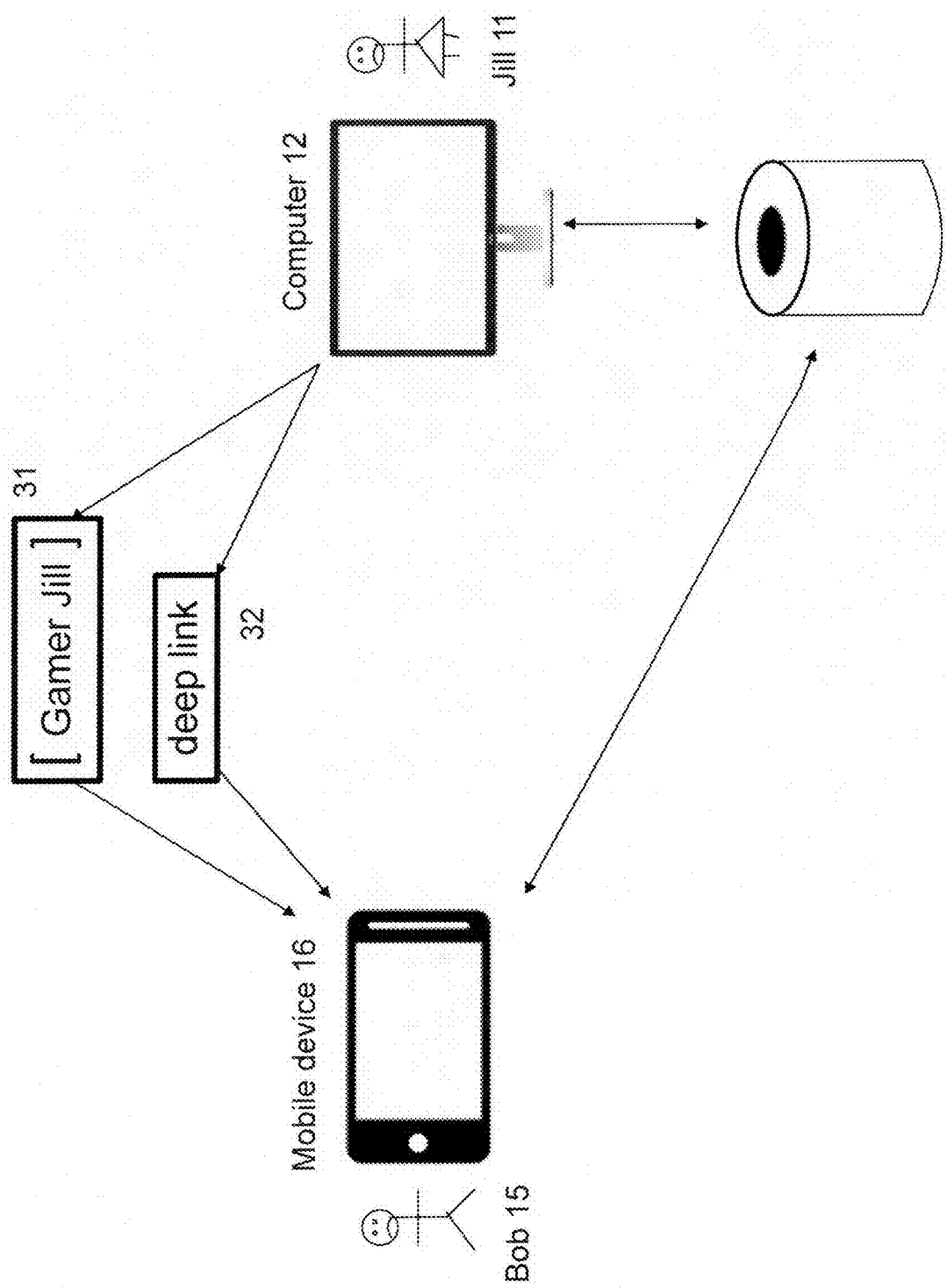
FIG. 3 shows the viewer watching the game using the game app.

A solution is shown in FIG. 3. As in FIG. 1, we have Jill 11 with her computer 12 talking to game server 13. But now Jill can send by various ways item 31, which is a linket [Gamer Jill], or deep link 32, to Bob. Or equivalently, he can effectively get one or both from her.

To be specific, consider item 31. A linket was described in earlier inventions, "Capacity and automated de-install of linket mobile apps with deep links", U.S. Pat. No. 9,792, 101; "Hashtag, deep link and linket for more user interactions" U.S. Pat. No. 10,042,946; "Linket to control mobile deep links" US Pending 20170109814. A linket is a Unicode label, akin to a domain name. But a linket is to link from a mobile app to "inside" another mobile app, or from a mobile browser to inside a mobile app.

In FIG. 3, [Gamer Jill] can be considered to be owned by Jill, akin to how she might own a domain. Or the game firm might have paid for and made [Gamer Jill] and then given it to her. Or assigned it to her while retaining ownership. This lets the firm reuse it if Jill were to shop playing the firm's game.

Figure 4:
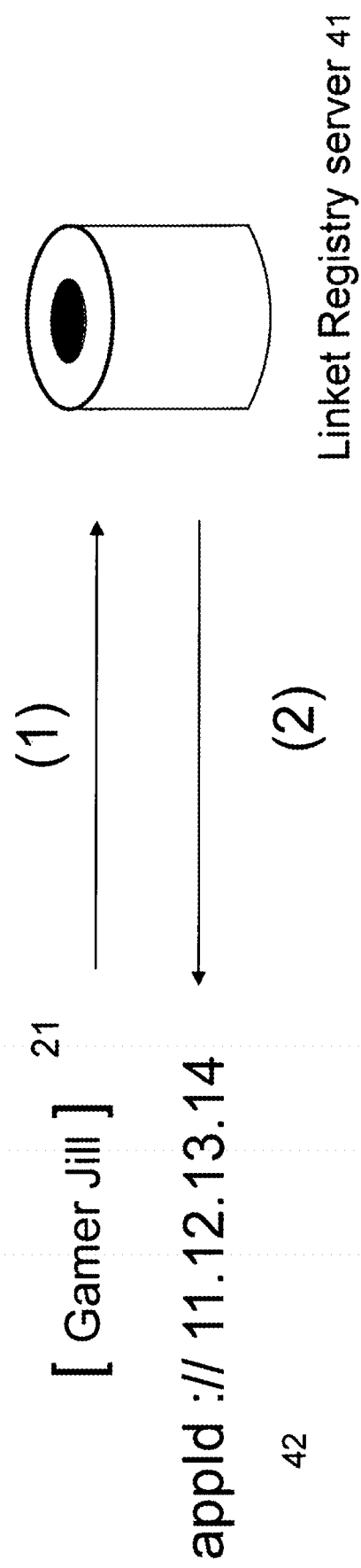
FIG. 4 shows a linket Registry server.

FIG. 4 shows a Linket Registry server 41. It accepts as input in step (1) the linket [Gamer Jill] (item 21). It returns in step (2) deep link 42, having an id of the game app in the app store for Bob's mobile device. The deep link also has the Internet address of a server run by the game firm. Here the example address is shown as an IPv4 address of 11.12.13.14. An IPv6 address could instead be used. And an optional port number could be used for v4 or v6.

For simplicity in FIG. 3, Registry server 41 is omitted, but the reader should be aware of its actual presence.

In our earlier patents and pendings, the address in the deep link was the address of Jill's computer. If it was a mobile device, the address would be a temporary address assigned to it by a hot spot if she used the latter to connect to the Internet. Or it could be an address assigned by her telecom carrier if she used the carrier to connect to the Internet. In either case, Bob's app would connect to her address, so he would have a direct peer-to-peer interaction with her.

In principle, the current situation might also use the above cases. But if Jill has many followers the bandwidth and memory requirements on her computer make this impractical. For esports, the network address in the deep link is likely to be an address in the game server's range of addresses. We assume that the game firm has the necessary capacity in bandwidth, memory and disk to support her audience. Also, bandwidth requirements are likely to be more severe for outgoing bandwidth from the server. Incoming bandwidth could be much less, like occasional typings from viewers. While outgoing bandwidth pertains mostly to incremental updates or complete redraws of the viewers' screens.

Figure 5:
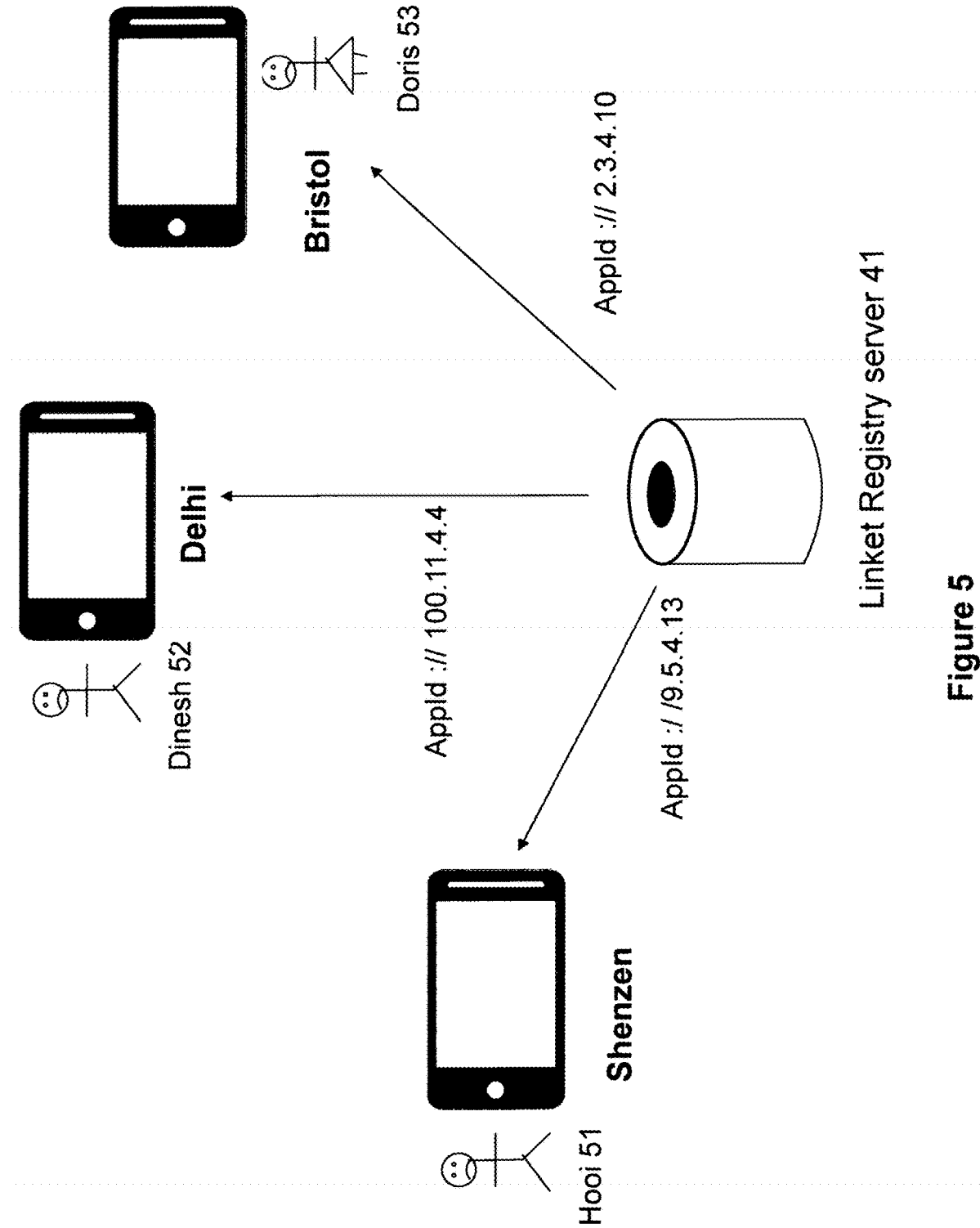
FIG. 5 shows the Registry sending different deep links for the same linket.

FIG. 5 shows 3 viewers in different parts of the world watching Jill. Hooi 51 in Shenzen. Dinesh 52 in Dehli. Doris 53 in Bristol. Each sends the same linket [Gamer Jill] to the linket Registry server 41. It replies with different deep links. These differ in the network addresses that the game apps on their devices are to contact. The addresses might be of local "mirrors" or Content Distribution Network (CDN) servers used by the game firm to handle global loads.

For simplicity, FIG. 5 shows the users using the same mobile device. And implicitly the AppId sent to the 3 viewers would refer to the same app. More generally, some viewers might be using a personal computer or laptop. And for mobile phones, some might use Android™ and others can use iOS™. Thus the appID could differ to reflect this.

FIG. 3 showed Jill sending [Gamer Jill] to her fans. How can this happen? FIG. 6 shows where Jill is assumed to have a mailing list of fans. She can send a mass email to them. Item 61 is an example, where it is easily customized with "Bob" as the recipient. More to the point, the email has a clickable string [Gamer Jill]. The black bar under that string indicates this. The assumption is that recipients read the email in a (mobile) browser. The browser thinks the string is an URL and makes it clickable.

If Bob clicks, a short sequence of events happens. The number of steps and the actions in each step may vary from device to device, and over time as perhaps changes are made to the browser and device operating system. But in essence a call is made to the Linket Registry server, sending the visible string portion of the linket. The Registry replies with the deep link and the latter is executed on Bob's device. His device checks first to see if the app is already present. If not, it is downloaded from the app store. Bob avoids a manual search of the store. In either case, the app is now on the phone. It is run automatically with the network address in the deep link as input. This step is where Bob avoids having to go to the game and then find in a table of active players the specific Jill he wants to watch.

Bob avoids 2 manual searches. This is the advantage of the deep link.

The second avoidance of a search takes this beyond the typical use of a mirror or Content Delivery Network (CDN). If the game is popular, it could have many Jills, each broadcasting their own game plays with that specific game, to fans across the world. A reader who followed the above might wonder why the address in the deep link is necessary. When Hooi from Shenzen has a device that goes to the firm server's home address, the server at that address can get Hoof's device address. It sees that Hooi comes from China and then forwards the request to the firm's machine closest to Hooi. But as said earlier, the firm can have several gamers playing. This leaves Bob with a manual search of gamers.

The game firm can have a range of addresses at its data centers. At each address can be the possibility of using a port number as an extra parameter. All this lets the firm assign multiple unique addresses to a gamer. Jill could have one such address at the firm's Guangdong data center, to service fans in southern China, and a different address at the firm's Heilongjiang data center, to service fans in northern China. (The deep link can have extra parameters to give Jill several unique deep links.)

Return to FIG. 6. Since the message is meant to be seen in a browser, there is a short distance between FIG. 6 and Jill having a website where she shows a webpage with [Gamer Jill]. Naturally, it will not be phrased as a letter. But the effect is the same. The page is for visitors who arrive at it by any means. Jill can promote her page on social media like Twitter™, Instagram™, Snapchat™ where she writes a message and inserts a link to her webpage.

More directly, her social media message can have her linket, written as a clickable quasi-HTML link. Assuming that her short message can overcome any length restrictions imposed by the social media site. Also, those social media sites are not game watching platforms. They have no incentive to suppress her messages.

Thus far, the discussion concerned going from a webpage/website to the game app. What about from an app to the game app? Such is possible. The simple case is a social media app that lets authors write messages with clickable links. The format need not be HTML. So long as the format is well defined, Jill could use it to promote her linket.

Note that on the competing Platform, Jill can also communicate with her fans. Most Platforms have some kind of message board. It lets the fans chat with each other and her and builds rapport. This improves the chances than fans keep watching her. But often the messaging is deliberately rudimentary. There may be a strict and short maximum length of a message. Messages might be restricted to not have links. This is likely done by the Platform to reduce spam that introduces links to external sites.

But even if HTML-like links are allowed in the message board, it can be expected that if Jill were to advertise her linket to bypass the Platform, reaction will be negative. The message board belongs to the Platform. It might have programs that detect linkets and remove them. And it could ban her. But it is very unlikely that the Platform could ban Jill from having her own website or using (external) social media to promote her linket. Assuming that eventually the Platform finds out about these, what can it do? It might in extremis ban her. But if the Platform is the dominant such platform, this might be considered abuse of power. In general Jill is not an employee of the Platform.

When Bob clicks on her linket (outside the Platform app) and gets a copy of the game app on his device, this would be essentially read-only. He can watch but cannot play. He sees what she sees. But he cannot fire her guns or throw her spears. If the game firm does this correctly, the read-only game is the same executable as the regular game. What happens is that when the game boots up, it calls home to the game server. The latter has a flag (1 or 0) that it returns to the game on Bob's phone. 1 means the game is read only. 0 means it is a full game. If the game instance on his phone gets a 0, it runs with full game playing functionality. No extra download of another version is needed.

This can simplify game development and maintenance.

So when the game is read only, it shows Bob ads or sells him a subscription to avoid the ads. And it can show a digital tip jar to let him donate to Jill. These are actions currently done by the Platform.

There is also an opportunity for the game firm. It can try to convert Bob to also being a player (when he is not watching Jill). Players generate more revenue for the firm than fans, per capita. It sells them weapons, skins, magic potions etc. Thus having the read and read only versions being the same executable removes a friction point of a second download. And because Bob is already a fan, the chances of him becoming a player might be greater than for a random visitor to the game site or app. Bob is already interested in the game. If he as a fan has watched some amount of ads or bought a subscription or donated to Jill, the game could offer him discounts on future purchases if he became a player.

So the transferring of Bob from watching on the Platform to watching in the game is more than just a making of similar fan functionality.

4: Mass Customization and Roaming

It should be clear what the advantages are to the game firm, as discussed earlier. The Platform's viewer now is the game's viewer. But why would gamer Jill disseminate her linket? One answer is that the firm might offer her better terms than the Platform. Suppose the Platform currently offers her all the donations (tip jar) and 50% of the ad revenue from showing ads to her viewers. The game firm might offer her all the donations and 60% of the ad revenue.

If Jill can do the steps of the earlier section and get fans to migrate to watching her on the game app, the game can offer the fans mass customization. This term is often used to describe how, say, a new car can be bought with features picked by the buyer, like colour, upholstery etc. As mentioned earlier, when the Platform shows Jill playing to many fans, as in FIG. 2, each fan sees basically the same images of her game.

But for fans of Jill watching thru the read only game, it can offer more. In the limit, each fan can decide uniquely what he sees in her game.

When Jill plays, what her screen shows depends on the game. But generally she might be seeing her character in a 3d world, in a third person view, where she sees her character, but is not seeing out of her character's eyes. The latter is a first person view. There can be elaborations. Her screen might also show a 2d map of her surroundings, indicating where she is in it. However no matter how elaborate or not, what the Platform gets is her game screen as basically an image of "flat" pixels. The Platform gets an image with no internal structure. Whereas the game server that makes the image makes it from parts, like furniture, monsters, Jill's character, her weapons etc.

Figure 7:
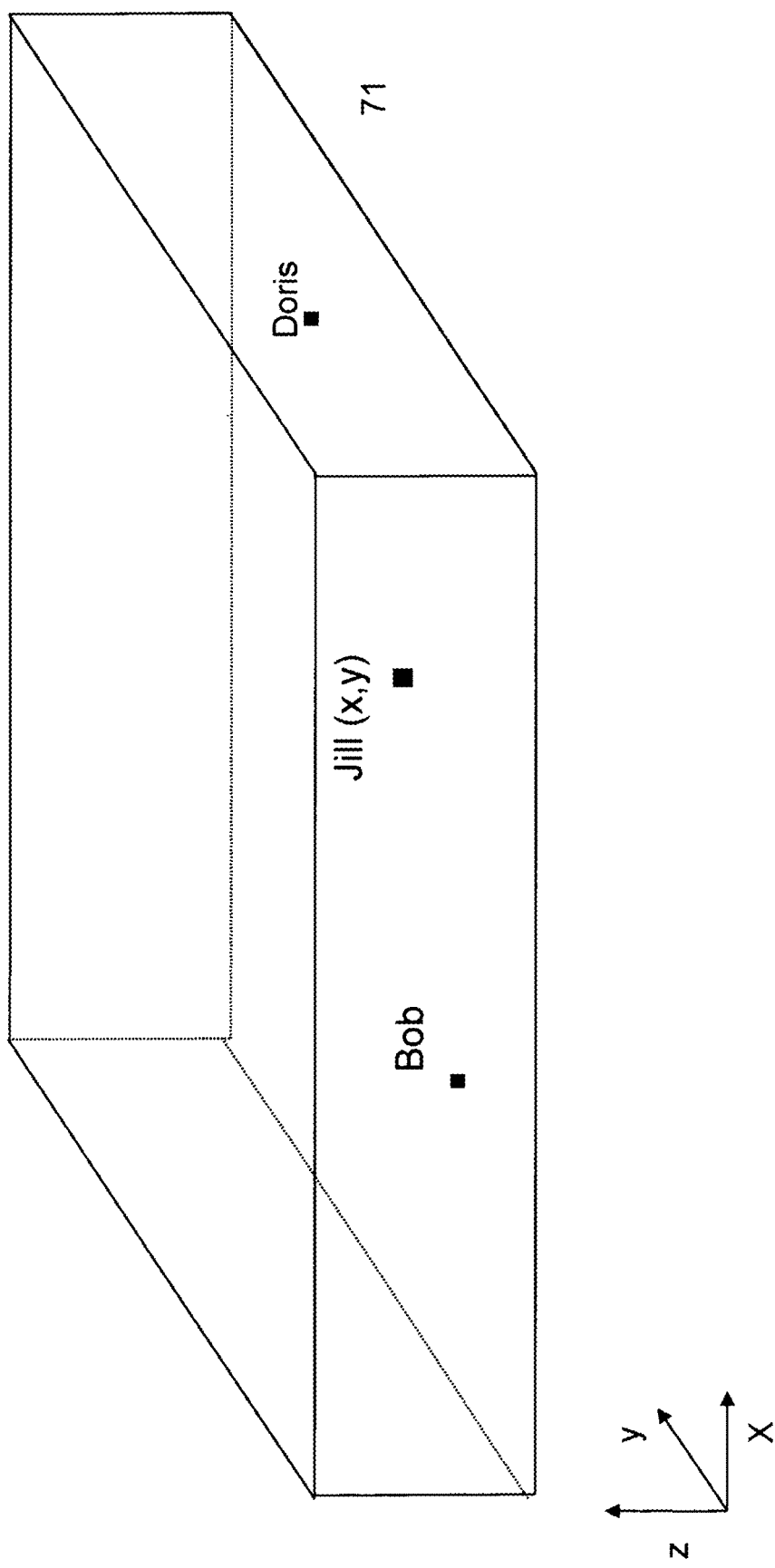
FIG. 7 shows a box in which Jill plays and with 2 fans watching.

FIG. 7 shows a box 71 which is a 3d world that Jill plays in. There is a point in the box at coordinates (x,y) where Jill's character is. We write this as "Jill (x,y)". The box has other parts—like treasure and monsters.

Now suppose Bob is watching Jill thru the read only game. Unlike the Platform viewer, who only sees a copy of Jill's screen, and only has it as a flat set of pixels, Bob has many choices. Bob interacts directly with the game server. The game can let Bob pick where in the environment he wants to be. Thus FIG. 7 shows him at a different place. Likewise with viewer Doris. She picks a place different from Jill or Bob.

This gives the game a competitive edge in viewing vis a vis the Platform. Thus far we described how the gamer might move some of her fans from the Platform to the game. But we did not address much why the fans would do so, other than just following the gamer's suggestion. Now fans have more control over their scenes, even in a read only game.

One variant is where the scene only has a few chosen places where fans can place themselves (the fans can be invisible to the gamer). These places might be manually chosen by the game designers.

One variant is where as Jill moves thru the environment, a fan could define a distance from her where his viewpoint will be. So the fan's location changes over time. His location at any given time is picked by the game. This avoids him having to manually follow her. Standard collision avoidance software now common in games can be used to enable this. Even though the fan might be invisible, having him move automatically thru the 3d game as though he was a material object improves the verisimilitude.

One variant is where a fan can pick the view seen by the gamer. This is the view also shown by the Platform. It can be available as a default.

One variant is that a fan can choose to change his viewing place or function as the game progresses. By function we mean if he chooses to follow her, and then later he makes another choice, like seeing the game from the roof of a tall building. The fan can roam thru the game.

One variant is where the fan can see a list of the favorite viewing places or functions, and he can pick from these. So Bob might want to see what most fans are seeing. Conversely, he might pick the least popular from the list, perhaps for a different perspective on the game. Here favorite can mean in terms of the choices made by other fans watching the current game. Or fans watching earlier instances of the game, assuming that the landscape of the game is mostly unchanged between instances.

One variant is that the game might define certain regions to be out of bounds for viewing from. For example, suppose Jill (and maybe other gamers) have to search the floors of a building, starting from the ground. The game could prohibit Bob from the tenth floor until at least 2 gamers have been on the floor.

One variant is that the gamer can decide what places a fan can be in, or not be in. If there are multiple gamers on the same team, the game can have some mechanism to let the team make these decisions. Perhaps like a voting method.

If the game has gamers in opposition to each other, and suppose gamer Tim says a church clock tower cannot be used as a fan vantage point. But gamer Susie says it can. The game could have a policy that a denial (by Susie) overrides Tim. Or vice versa.

Suppose the game lets Tim decide that a place can be used by a fan. Can he later change his mind? The game can have a policy to allow or deny this.

The game firm can charge the fan extra for being able to do some of the variants outlined above. For the fan watching what the gamer sees, this can be the default, with no charge. But some or all of the other variants might entail a fee.

5: Team Includes Fans

In gaming, a team refers to a group of gamers acting cooperatively. But with fans being able to wander thru the game environment a different case emerges. A team can also be at least 1 gamer and 1 fan. A crucial sub-case is where the team is 1 gamer and several fans. In standard esports fans can message the gamer. Combining this with fans now being able to be in the game offers vastly more game play. Fans could act as the gamer's scouts, moving and looking for clues and enemies.

An issue is whether the fans are visible in the game to other fans and gamers. This itself can be a policy of the game. One case is no. But even here there are subcases. One subcase is that fan Bob is always invisible to gamer Jill. Another is that he starts off invisible but can become visible through some action of his or Jill. And if he is visible, and if the game has gamers opposing Jill, then he might or not be visible to her opponents.

The visibility of a fan gives rise to another question. If Bob is invisible, he is a ghost. So several fans can occupy the same space. If he is visible, this can act to exclude other fans from being in his space, where the latter is not just the 3d volume of his visible character, but also some surrounding "whitespace".

If Jill has several fans on her team and they are visible, they might be depicted as ghost-like. So the image of the fan can appear semi-transparent. When she or other gamers see fan Bob, they can partially see the backdrop behind him. Her fans can have some visible indicator that they are on her team. For example, her fans are shown as partly green. While another gamer's fans are shown as partly red.

If a fan is visible to a gamer, she might have a means to turn this off, to focus on her gameplay.

Fans might be (mostly) invisible to gamers but visible to each other. This avoids distracting gamers. And it lets fans have their own individual and collective dynamics. They can experiment with finding best viewing locations and argue over these.

If fans can be on a team then all fans can be in 2 groups. One. Where the fan is in a team. Two. Where the fan is not associated with any gamer. The actions of the first group help ensure that the game is a unique experience for all involved. And that the watching is very different from the single mass view given by the Platform.

If Bob and Dave are fans on Jill's team, the message board can let them just privately message between themselves. So other teams cannot read their plans. The message board might still let all 3 each make public messages that are world readable.

With Platforms the prior art conventionally often has them enabling digital tip jars. Fans can donate money to a favourite gamer. This submission extends that. Suppose Jill has fans on her team. Fan Bob previously played another instance of the game. In that, he acquired some digital game elements, like a potion of healing, a scroll of rust (to be applied to a monster or human opponent wearing a coat of armour), 200 gold coins, and a magic sword. The game might let Bob use these in future games. In Jill's current game, he logged in and can access his assets. As Jill's team member, he can give or swap these with her. Perhaps also with other fans on her team.

The ability of fans and gamer to trade assets with each other open significant new avenues of game play vis a vis what the Platform offers.

When Bob applies to be a fan on Jill's team, he can list what digital assets he has, and this list is automatically verified by the game. Jill can decide on letting him join based in part on what he might offer to let her overcome obstacles. Again, this is beyond the scope of the Platform.

Jill can also offer to trade or give assets to fans on her team. Suppose Jill is very good and has captured 2 potions of healing and 3 magic bows. But she does not need so many bows. She can give 2 bows to her team's fans. In part this might be because the game puts a limit on how many items she can carry. In most games with such limits, she picks something she carries to discard. A waste. Instead by giving a bow to Jeff who is on her team, he can use it as a gamer in a future instance of this game. Very useful to the game. Now Jeff has an incentive to play that future instance as a full player.

This can be extended. Suppose instead of Jill having found or captured 3 magic bows, she had only captured 1 magic bow. But as she wanders along, she finds another bow. Fans on her team can see this. Maybe fans not on her team also. Fan Bob could ask her to pick it up, to give to him. More to the point, Bob might offer to tip her. She picks up the bow. Bob tips her some amount. She transfers the bow to Bob.

One variant is where when Jill finds the second bow, and before she picks it up, her fans might bid for it. An auction can be done by the game. The highest bidder pays some amount to her tip jar. She picks up the bow and transfers to him.

In an earlier section we described how the game firm can try to convert a fan into a gamer. This section outlines how to incent the fan.

This addresses a longstanding inefficiency in gameplay. A gamer goes to the end of her game with too many assets. Traditionally all surplus assets disappear when her game finishes. Now the above is a carry forward to future games. And the mechanism of trading or just giving surplus assets to others (fans) acts as a social link between her and the recipients. This strengthens the social bonds and makes more gameplay.

It also applies in 2 cases.

One. When Jill is winning (by the rules of the game) and has surplus assets.

Two. When Jill is losing. She has assets that will not help her avoid game over. But could help others, as gamers.

Thus far Jill was described as donating surplus assets to fans on her team. An extension is where she donates (or trades) with fans not on her team. They are just "traditional" viewers watching her. Again, this can act to make extra gameplay by those viewers.

The transferring of assets from Jill to fans at the end of the game has 1 nuance. Some games might require Jill at the end of the game to have a total score. This score might include summing up the values of assets she has at that time. If she transfers assets before that time it can lower her final score, so she might not do that. Thus a game might have an endpoint where all Jill's activity stops and her score is toted up. And she then can appear in a leaderboard if her score is high enough. After which, the game can let her transfer some or all of her assets to fans.

This section's characterization of Jill hitherto ending her game with assets that then vanish as a loss might be disputed. A game designer could assert that since the marginal cost of the assets to the game firm is effectively zero, there is no tangible loss. Our rejoinder is that this may be so. But the steps of his section lets the game firm use those zero cost assets for possibly greater efficacy. To make a social entanglement of the fans, who are now using the game to watch gamers. So that the fans come back as fans in future games and perhaps as gamers.

6: Time Travel

Earlier the game we discussed was implicitly taken to be a game being played in realtime by Jill as Bob (and other viewers/fans) watches. There can be real concerns about this for some games where Jill is in a contest with others A fan who goes into the 3d environment of the game and who does not join any team might be a covert supporter of Jill. He might be able, by the rules of the game, to discern where other human and non-human characters are, and where treasure, food and weapons might be found. He and Jill could agree prior to the game so that he messages her by some means, outside the game, with this information during the game.

One solution is for contestants in a contest to not be able to get messages from outsiders, in the game. But unless the contestants are playing on computers that were pre-checked by the umpire to be clean of unnecessary programs, then the fan might send Jill information via other communications programs.

Suppose the game instance in question being played by Jill is a recorded game. And Bob is now watching that game. The previous concerns go away, at least for Bob's interaction. Note that the game is a ficticious 3d universe, where the recording has a start time and an end time. Within these time limits we have time travel.

Bob can pick a starting time and place when and where he goes into the game to watch. He can study Jill's action techniques and replay these at will, including in slow motion and faster motion, and zooming in (or out). Akin to professional (real) athletes studying recordings of their own games, to improve their techniques. And studying recordings of their opponents. Bob might be trying to improve his own game, rather than just being a (passive) fan of Jill.

This ability to replay a game and see it from different locations in the game is another way for the game firm to compete against the Platform.

One note is a modification of the deep link, in order to access a recorded game. In general, Jill can have several recorded games. Suppose there are 50 such games. They are stored on the game server in some manner. The games have to have unique labels to distinguish them from other recorded games. Without loss of generality, assume her games are stored as Jill0001, Jill0002, . . . Jill0050.

Previously, the deep link was appId://identifier(network address).

Now the deep link can be appId://id(network address)/instance where instance ranges from Jill0001 to Jill0050. The pseudo-URL notation is arbitrary but useful to convey the meaning to a reader acquainted with HTML.

7: Gamer Having Esports Fans and Native Fans

Figure 8:
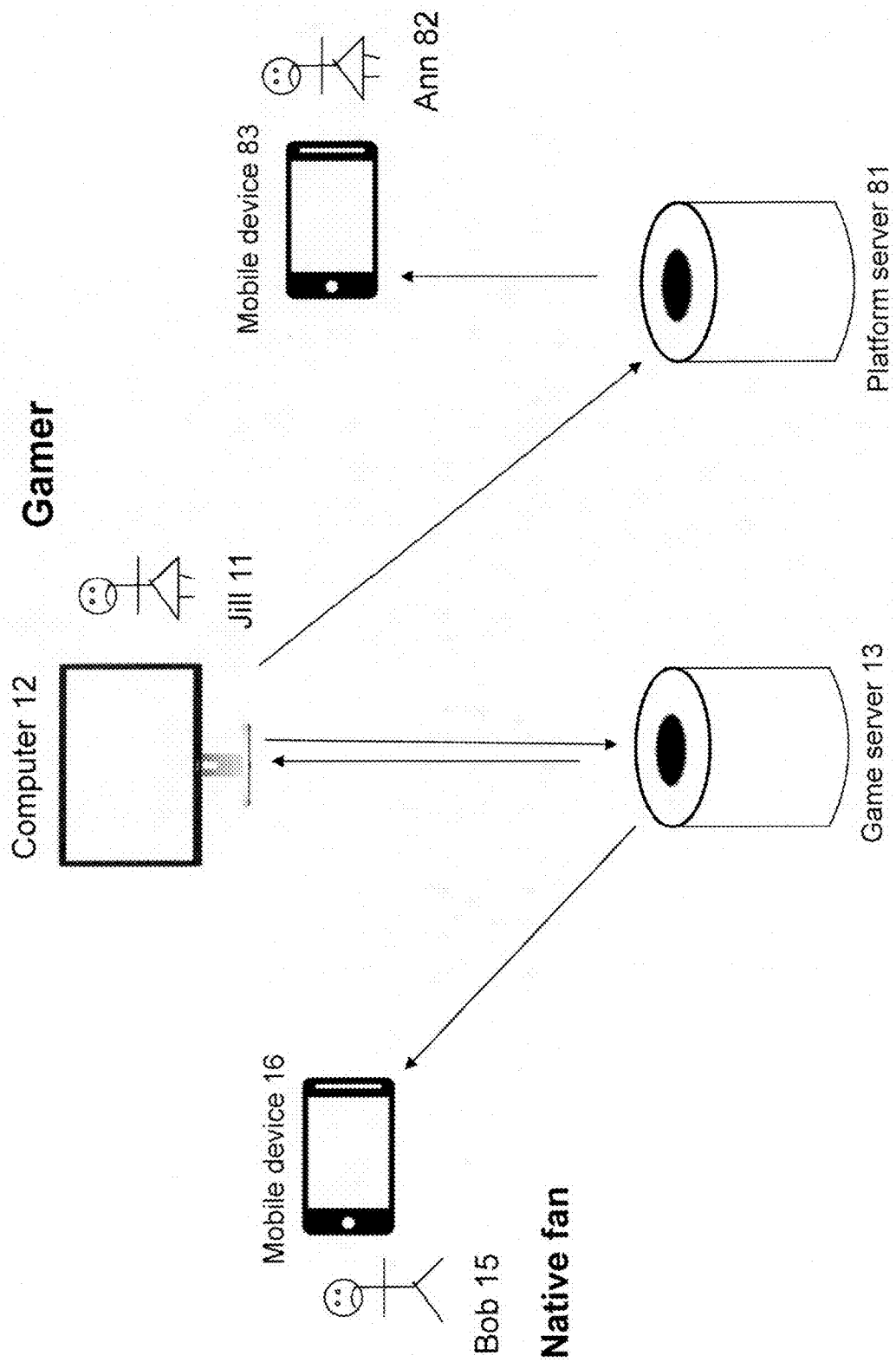
FIG. 8 shows Ann watching Jill via Platform.

FIG. 8 shows Gamer Jill having 2 audiences. One is viewer Bob 15 watching on his mobile device 16, via a game app that is read only. He is what we call a native fan. The other fan is Ann 82. She watches on mobile device 83, using the Platform app served by Platform server 81. The scenario is that Jill migrated some of her fans from the Platform to watching on the game app, but she still has fans on the Platform. Jill is being paid by the game firm and the Platform. She wants to migrate Ann to watching via game server 13. How can she do this?

One way is for the game to let her use her native fans to attract Ann.

Assume Bob picked some location in the game world that Jill plays. Or Bob is moving around in the game world. The game app being used by Jill can have an option that Bob's location and maybe some icon or image representing him can be shown on her screen. One purpose is not just for Jill to see Bob, but so that others watching on the Platform can see a presence of Bob.

Then when Ann watches via the Platform app, she likely will see this graphical presence of Bob. This can be used to advertise an ability to watch Jill in future instances of the game, or perhaps in the current game, by migrating from the Platform app to using the read only game app, as Bob is doing. A point is that Ann may be a viewer who does not know of this ability to watch Jill via the game app itself.

When Jill uses a Platform program on her device, that captures her game screen, the program likely shows how many fans on the Platform are watching her right now. Jill might find it financially advantageous to induce the migration. If so, and supposing she is not under some immediate pressing time constraint to hurry along her game, she can show an icon of Bob, if this is not usually present on her screen. The screen might also show some text indicating what manual steps Ann can take to get the game app onto her device 83. This text can be pre-written by the game firm, instead of being written by Jill.

There are unlikely to be clickable links in the game portion of the Platform screen, that are under the control of the game or Jill. Because the Platform is likely just taking a (flat) screenshot of Jill's game screen.

If Jill has a linket [Gamer Jill], the text on Jill's screen can show, say, Jill's website. Ann can manually go there in the mobile browser of Ann's device. Ann finds [Gamer Jill] on a page as a clickable link in her mobile browser. Clicking it leads to the steps described earlier, to install the read only game app and launch it to show Jill's game instance. In 1 instance, Ann can then transition apps to keep watching the same current game instance of Jill. After this transition, Ann might hopefully close her Platform app.

Or Jill's website can have a place when Ann can add her email address or phone number. By pressing a button on Jill's page, Ann gets an auto-generated email or text message that has [Gamer Jill] as a clickable link. Etc.

A moment's thought will show that Bob's presence in Jill's game is actually superfluous for the above steps. Even if Jill has no one watching her on the read only game app, she can still do the above, to initiate a first migration from the Platform.

It is difficult for the Platform to combat this. Jill can make the above appear at a time under her control. To the Platform program on her device, this is just some pixel pattern. If the program runs OCR to find text, the text can vary over time. The game can rewrite the text to make it harder to detect. Plus, if the text refers to Jill's website, other players will have different websites and so different texts to detect. And the game can use URL obfuscation sites like Bit.ly to further try to avoid detection.

This differs from our earlier remarks about the Platform's screen in FIG. 2. The message board of the screen already has input from users as characters. There is no need to run OCR on these. Whereas Game Screen 22 is essentially a flat collection of pixels.

A separate thing Jill can do is access a command on her game screen that makes a barcode, like a QR code or a Data Matrix code. The barcode encodes, for example, an URL for Jill's webpage where, as above, the viewer can add himself to her mailing list and get an email with a linket. This assumes that at some earlier time in her game, she had setup her account with the game so that she told it her URL. Or the barcode could encode the linket in clickable form, so that after Ann decodes it on device 83, she can just pick it to activate it.

For the cases of Jill's game screen showing text with an URL, or showing a barcode, even if the Platform detected this, would the Platform try to suppress it? The suppression can be done by overlaying an opaque rectangle over the text or barcode for the duration that it exists. Or the Platform might fuzzy-fy the text in the game screen. But this is ugly to the viewer. Such methods are likely to be seen as censorship. Whereas for removing links in the message board of the Platform—that can be seen as acting against third party spammers and fraudsters. And the message board is made by the Platform, while Jill's screen comes from the game itself.

Remember that the game firm owns the copyright on the game. While the firm permits the Platform to show the firm's IP, the firm should have the right to insist that the screen capture of the game should be shown in toto and not subject to editing or censorship.

Now suppose that instead of just Bob watching on the read only game app, there are 100 such Bobs. Jill's game can show a distribution of these viewers, rather than just 1 viewer. Perhaps as a heat map type of display, with a mass of icons close to each other meaning that several viewers are using in or around that location.

FIG. 9 shows a Map 91 of Jill's game instance. Jill 11 is at the symbol o. The other letters designate locations of native fans. There are many things the letters could mean. The {m, g, x} could represent non-overlapping divisions of the fan base. For example, m might mean fans coming from Internet addresses in North America, g is fans from Asia, x is fans from the rest of the world.

Note that this invention is originally submitted to the US PTO, which, as far as we know, restricts figures to black and white. There is no colour coding. The reader is asked to imagine that colour coding might also be used. So some x's are green, which could mean that they arrived at the game over an hour ago. Other x's are blue, which means they arrived in the last hour.

The letters (which of course can be replaced by non-letter symbols) might instead encode information about how many fans are at each location of a letter. If Jill has many fans, this might be necessary to show the distribution of the fans. So x's could be groups of 100 or less fans, m is for groups between 100 and 1000 fans, and g is groups of more than 1000 fans.

The US PTO also does not allow video "figures" (as far as we know). Imagine that the symbols in FIG. 9 can move over time, as the player moves and as some or many fans move to follow her.

8: Using Only Deep Links

Section 3 and FIG. 3 described how to migrate a fan from the Platform to viewing using a read only game app. A linket that described the gamer was used to initiate the action. One other way omits the linket and just uses a deep link of the form appId://identifier(network address).

Sometimes the identifier can just be the identity operation, so the RHS of the deep link is just the network address itself.

Suppose Jill has a mailing list of fans. She can mail to this list or a subset of it (that includes the putative Bob) a message with deep link 32. Bob clicks it and the game app is installed and run on his device and it connects to Jill's game instance.

There is a problem. Jill has to get the deep link from the game server. The address in the deep link is of a machine run by the game firm. The firm assigns the machine (or a program running on it) to service requests from fans like Bob who want to watch Jill's game instance. Jill goes this deep link with an address, today. Tomorrow, she plays a new instance of the game. The server might assign a different address. This contrasts with where she just sends the linket [Gamer Jill] to her mailing list. And where the game server updates (sends) a new deep link to the linket Registry server, so that changes in the address can be ignored by her.

9: A Fan Acting as a Tour Guide

A fan can act a a tour guide. Once there are several fans watching thru the game app, this can arise. Bob might be able to advertise himself as a tour guide on the read only app used by fans. Other fans can sign up with him. So this is a group of fans defined in the game. As Bob moves thru the game, they automatically follow him. When he writes or speaks commentary about Jill's gameplay, only the group can read or hear this.

He can be compensated by the fans in his group. Perhaps via donations or fixed fees. He can restrict the group to only those who paid. He might be experienced in following the specific gamer Jill. So the fans are primarily interested in Jill.

Conversely, if Bob is famous enough in his own right as a guide of various gamers, he could amass a group of fans in the read only game app. Then he picks a gamer, or maybe lets them vote on a gamer to follow. The voting can be implemented by the game.

Real world guides are physically limited in the size of their groups. Bob has no such restriction.

The issue arises of Bob's compensation vis a vis Jill's. The game could let Jill restrict who can be a tour guide for her games. She might restrict to guides who agreed to some split of the revenue. The game might give her, at the start of her game, a table showing the guides who want to be her guides, and the percentage split of the ad revenue they offer to take for themselves. So Bob offered to take 40% while other guides wanted more. She picked Bob to be the only guide.

The above assumes there is 1 revenue source from the game. Another way is for Jill to get her normal donations and ad revenue, as she would when there are no guides. But Bob's revenue is separate. And she might want and be able to insist on some cut of his.

The game could let her pick several guides.

For recorded games, a tour guide can be especially useful. If he is explaining techniques used by Jill, he has the time to do so. He can stop and start the game, and go back in time. He can do slow motion and zoom in if desired.

An important special case is where Jill is her own tour guide. If she is famous as a gamer, she might be able to make more revenue by giving live tours of her recorded games.

This also applies even if no linkets or deep links are used. When there is a game with a gamer playing. And viewers watching through another version of the game app.

I claim:

1. A system of a game server, a registry, a computer used by a gamer to play a first game instance, and a mobile device used by a viewer; the first game instance being served by the game server; the mobile device showing an electronic message to the viewer; the message having a label; the label being a Unicode string; the mobile device getting a selection of the label by the viewer; the registry getting the label from the mobile device; the registry sending a deep link to the mobile device; the deep link having an identifier of the game in an application store; the deep link having an identifier of a network address of the game server; the mobile device installing and running a second game instance; the second game instance communicating with the network address of the game server; the second game instance showing activity in the first game instance; the second game instance letting the mobile device send and receive messages with the gamer and other viewers; the second game instance letting the mobile device donate money to the gamer; the second game instance lets the mobile device obtain a different view of the first game instance than a view seen by the gamer; the viewer is depicted as semi-translucent to the other viewers and the gamer.

2. The system of claim 1, where the game server obtains the label from the registry; where the game server owns the label; the game server assigns the label to the gamer.

3. The system of claim 1, where the gamer obtains the label from the registry; where the gamer owns the label.

4. The system of claim 3, where the game server sells a subscription to the viewer; the game server does not show ads to the viewer, for the duration of the subscription.

5. The system of claim 1, where the gamer has an email list; the gamer sends the electronic message to the list; the electronic message inviting recipients to watch the gamer play the first game instance.

6. The system of claim 1, where the game server has an email list; the game server sends the electronic message to the email list; the electronic message inviting recipients to watch the gamer play the first game instance.

7. The system of claim 1, where the gamer posts the electronic message to a website or application; the electronic message inviting recipients to watch the gamer play the first game instance.

8. The system of claim 7, where the website is owned by the gamer.

9. The system of claim 1, where the game server shows ads to the viewer.

10. The system of claim 1, where the game server sells an upgrading of the game on the mobile device to a full game playing version; the upgrading being indicated by a status value for the mobile device; the game server holding the status value; a third game instance starts on the mobile device; the third game instance gets the status value from the game server; the third game instance offers full game playing on the mobile device.

11. The system of claim 1, where the second game instance lets the mobile device obtain a different view of the first game instance than the view seen by the gamer.

12. The system of claim 1, where the second game instance lets the mobile device pick a location in a virtual world of the first game instance in which to watch the game instance.

13. The system of claim 1, where the second game instance lets the viewer define a distance; the gamer moves through the first game instance; the second game instance moves a location of the viewer to follow the gamer at the specified distance.

14. The system of claim 1, where the second game instance defines regions within which viewers cannot be.

15. The system of claim 1, where a team consists of the gamer and the viewer; the viewer acting cooperatively with the gamer, to aid the gamer in a playing of the first game instance.

16. The system of claim 15, where the viewer has an asset of the game, obtained by the viewer playing an earlier instance of the game; the viewer giving or trading the asset to the gamer.

17. The system of claim 15, where the gamer obtains an asset of the game during playing of the first game instance; the gamer sending the asset to the viewer; the viewer using the asset in a future instance of the game, where the viewer acts as a gamer.

18. The system of claim 1, where a barcode is shown on a screen of the first game instance; the barcode encoding an URL of a webpage; the webpage showing the label as selectable.

19. The system of claim 18, where the barcode is a QR code or a Data Matrix code.

* * * * *